United States Patent
Chin et al.

(10) Patent No.: US 9,684,101 B2
(45) Date of Patent: Jun. 20, 2017

(54) OPTICAL ZOOM STRUCTURE

(71) Applicant: SILICON TOUCH TECHNOLOGY INC., Hsinchu (TW)

(72) Inventors: Chi-Yuan Chin, Hsinchu (TW); Zhi Gao Xu, Hsinchu (TW); Lin Ping Zhang, Hsinchu (TW); Yong Cao, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 349 days.

(21) Appl. No.: 14/620,441

(22) Filed: Feb. 12, 2015

(65) Prior Publication Data

US 2015/0260884 A1 Sep. 17, 2015

(30) Foreign Application Priority Data

Mar. 12, 2014 (TW) .............................. 103108663 A

(51) Int. Cl.
*G02F 1/1335* (2006.01)
*G02B 3/00* (2006.01)
*G02B 13/04* (2006.01)
*G02B 15/00* (2006.01)
*G02B 3/14* (2006.01)
*G02F 1/29* (2006.01)

(52) U.S. Cl.
CPC ............. *G02B 3/0081* (2013.01); *G02B 3/14* (2013.01); *G02B 13/04* (2013.01); *G02B 15/00* (2013.01); *G02F 1/29* (2013.01); *G02F 2001/294* (2013.01)

(58) Field of Classification Search
CPC ......... G02F 1/1335; G02F 1/29; G02B 15/00; G02B 3/14; G02B 3/0081
See application file for complete search history.

(56) References Cited

U.S. PATENT DOCUMENTS

| 6,166,784 | A | 12/2000 | Murata et al. |
| 7,369,327 | B1 | 5/2008 | Nishioka |
| 2010/0259833 | A1 | 10/2010 | Jannard et al. |
| 2012/0262663 | A1* | 10/2012 | Chin .................. G02B 3/14 349/200 |

(Continued)

FOREIGN PATENT DOCUMENTS

| CN | 101208627 A | 6/2008 |
| CN | WO2009/073387 A1 | 6/2009 |

(Continued)

*Primary Examiner* — Timothy L Rude
(74) *Attorney, Agent, or Firm* — Li & Cai Intellectual Property (USA) Office

(57) ABSTRACT

An optical zoom structure includes an amplifying set, a focusing set, and an image display region. The amplifying set resembles the diverging optical effect and includes a first fixed focal set and a first liquid crystal lens. The focusing set resembles a converging optical effect and includes a second fixed focal set and a second liquid crystal lens. The first liquid crystal lens and the second fixed focal set are disposed between the first fixed focal set and the second liquid crystal lens. The first distance is from the first fixed focal set to the first liquid crystal lens. The second distance is from the first liquid crystal lens to the second fixed focal set. The third distance is from the second fixed focal set to the second liquid crystal lens. The fourth distance is from the second first liquid crystal lens to the image display region.

8 Claims, 4 Drawing Sheets

(56) References Cited

U.S. PATENT DOCUMENTS

| | | | |
|---|---|---|---|
| 2012/0320288 A1 | 12/2012 | Baek et al. | |
| 2013/0201436 A1* | 8/2013 | Choi | G02F 1/133526 349/193 |
| 2013/0235304 A1* | 9/2013 | Lee | G02F 1/133526 349/96 |
| 2014/0160379 A1* | 6/2014 | Wu | G02B 27/2214 349/15 |
| 2014/0368776 A1* | 12/2014 | Kadomi | G02B 3/14 349/123 |

FOREIGN PATENT DOCUMENTS

| | | |
|---|---|---|
| CN | 101821658 A | 9/2010 |
| CN | 102388332 A | 3/2012 |
| JP | 2000-081573 A | 3/2000 |
| JP | 2008-139684 A | 6/2008 |
| JP | 2013-003588 A | 1/2013 |
| TW | 201400881 A | 1/2014 |
| TW | M474146 U | 3/2014 |
| WO | WO2006/110283 A2 | 10/2006 |
| WO | WO2008/010124 A1 | 1/2008 |
| WO | WO 2008/010124 A1 | 1/2008 |
| WO | WO2010/117731 A2 | 10/2010 |

\* cited by examiner

OPTICAL ZOOM STRUCTURE

BACKGROUND

1. Technical Field

The present invention relates to an optical zoom structure; in particular, to the optical zoom structure including a liquid crystal lens.

2. Description of Related Art

In general, an optical zoom system includes at least an amplifying optical lens set and at least an adjusting optical lens set. The amplifying optical lens set resembles a diverging optical effect and can amplify the image. The adjusting optical lens set resembles a converging optical effect and can converge the amplified image, so that the user is able to see the amplified image.

However, in order to gain different zooming magnifications, the optical zoom system has to change the distance between the amplifying optical lens set and the adjusting optical lens set or adjust the design of the optical lens sets. The size of the optical zoom system is hard to be reduced. In addition, the complexity and the cost accounting of the optical zoom system design is increased.

SUMMARY

The present invention provides an optical zoom structure which includes two liquid crystal lenses. The zoom magnification of the optical zoom structure can be changed by adjusting the applying voltage to the liquid crystal lenses.

The present invention provides an optical zoom structure. The optical zoom structure includes at least an amplifying set, at least a focusing set, and an image display region. The amplifying set resembles the diverging optical effect and includes a first fixed focal set and a first liquid crystal lens. The first fixed focal set includes a plurality of first optical lenses. The focusing set resembles the converging optical effect and includes a second fixed focal set and a second liquid crystal lens. The second fixed focal set includes a plurality of second optical lenses. In addition, the focusing set is disposed between the amplifying set and the image display region. The first liquid crystal lens and the second fixed focal set are disposed between the first fixed focal set and the second liquid crystal lens. The distance between the first fixed focal set and the first liquid crystal lens is a first distance. The distance between the first liquid crystal lens and the second fixed focal set is a second distance. The distance between the second fixed focal set and the second liquid crystal lens is a third distance. The distance between the second liquid crystal lens and the image display region is a fourth distance.

In summary, the present invention provides the optical zoom structure. The optical zoom structure includes the amplifying set and the focusing sets. The amplifying set includes the first fixed focal set and the first liquid crystal lens. The focusing set includes the second fixed focal set and the second liquid crystal lens. The first fixed focal set, the first liquid crystal lens, the second fixed focal set, the second liquid crystal lens are fixed in the optical zoom structure. Thus, the size of the optical zoom structure can be smaller than the prior art. The focal length of the optical zoom structure is changed by adjusting the applying voltage of the first liquid crystal lens and the second liquid crystal lens. Moreover, in the present invention, the number of the amplifying set and the focusing set can be changed so as to gain different magnifications.

In order to further understand the instant disclosure, the following embodiments and illustrations are provided. However, the detailed description and drawings are merely illustrative of the disclosure, rather than limiting the scope being defined by the appended claims and equivalents thereof.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

Figure 1:
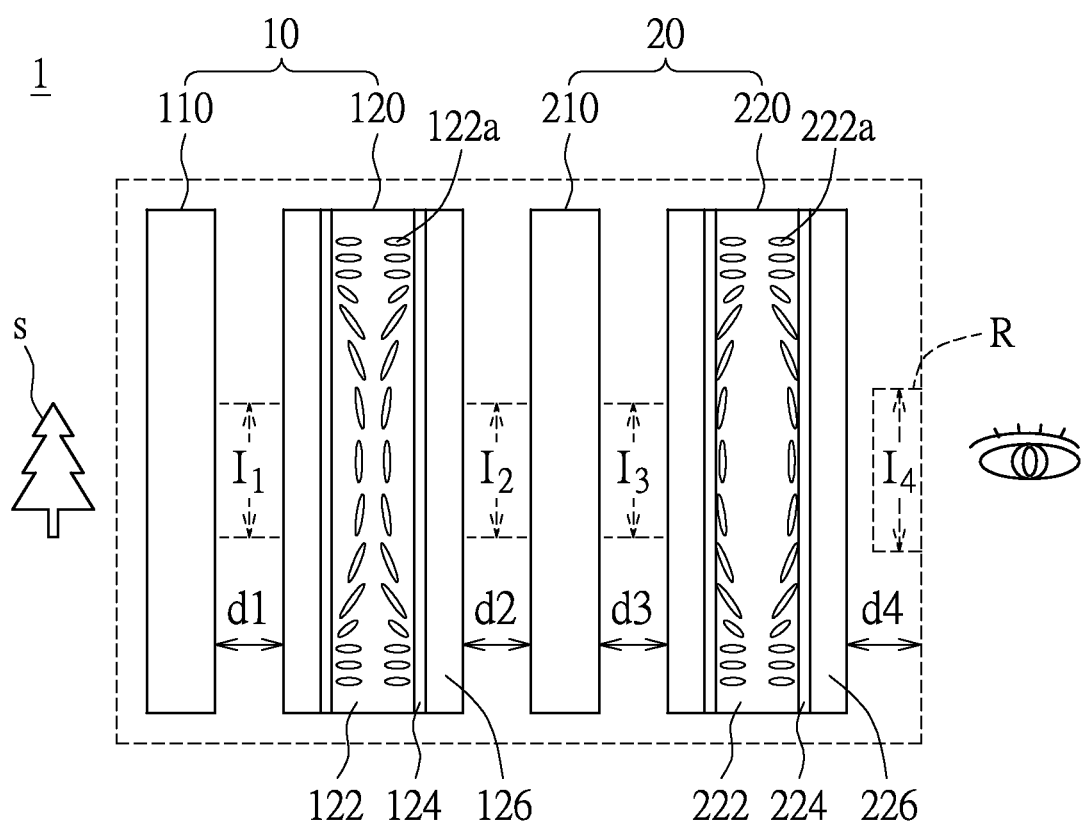
FIG. 1 is the schematic view of the optical zoom structure in accordance with a first embodiment of the instant disclosure.

FIG. 1 is the schematic view of the optical zoom structure 1 in accordance with a first embodiment of the instant disclosure. Referring to FIG. 1, the optical zoom structure 1 includes an amplifying set 10, a focusing set 20, and an image display region R. The amplifying set 10 includes a first fixed focal set 110 and a first liquid crystal lens 120. The focusing set 20 includes a second fixed focal set 210 and a second liquid crystal lens 220. The amplifying set 10 resembles a diverging optical effect and the focusing set 20 resembles a converging optical effect.

As shown in FIG. 1, the focusing set 20 is disposed between the amplifying set 10 and the image display region R. The first liquid crystal lens 120 is disposed between the first fixed focal set 110 and the focusing set 20. The second fixed focal set 210 is disposed between the amplifying set 10 and the second liquid crystal lens 220. In other words, the first liquid crystal lens 120 and the second fixed focal set 210 are disposed between the first fixed focal set 110 and the second liquid crystal lens 220.

Specifically, the first distance d1 is the distance between the first fixed focal set 110 and the first liquid crystal lens 120. The second distance d2 is the distance between the first liquid crystal lens 120 and the second fixed focal set 210. The third distance d3 is the distance between the second fixed focal set 210 and the second liquid crystal lens 220. The fourth distance d4 is the distance between the second liquid crystal lens 220 and the image display region R. In the present embodiment, the first distance d1 is in the range of 0.5 to 2 mm, the second distance d2 is in the range of 0.1 to 20 mm, the third distance d3 is in the range of 0.1 to 20 mm, the fourth distance d4 is in the range of 0.5 to 10 mm.

In addition, the first fixed focal set 110 includes a plurality of first optical lenses. The second fixed focal set 210 includes a plurality of second optical lenses. The first optical lenses include the concave lens, the convex lens, and the cemented lens. The arrangement of the first optical lenses is the concave lens, the convex lens, and the cemented lens in sequence. The first optical lenses resemble a diverging optical effect. On the other hand, the second optical lenses include the concave lens, the convex lens, and the cemented lens. The arrangement of the second optical lenses is the convex lens, the concave lens, and the cemented lens in sequence. The second optical lenses resemble a converging optical effect. The curvatures of the first optical lenses and the second optical lenses are constant. Thus, the focal lengths of the first fixed focal set 110 and the second fixed focal set 210 are constant.

The first liquid crystal lens 120 includes a first liquid crystal layer 122, a pair of first alignment layers 124, and a pair of first driving electrode plates 126. As shown in FIG. 1, the first driving electrode plates 126 are disposed on two sides of the first liquid crystal layer 122. The alignment layers 124 are disposed between the first liquid crystal layer 122 and the first driving electrode plates 126 individually. The first liquid crystal layer 122 has a plurality of first liquid crystal molecules 122a. After supplying the voltage to the first driving electrode plates 126, the first liquid crystal molecules 122a can be changed to resemble the optical effect similar to the concave lens. In addition, the first driving electrode plates 126 can change the refractive index distribution of the first liquid crystal layer 122 by adjusting the supplying voltage, so as to obtain different focal lengths.

On the other hand, the second liquid crystal lens 220 includes a second liquid crystal layer 222, a pair of second alignment layers 224, and a pair of second driving electrode plates 226. The structure of the second liquid crystal lens 220 is similar to the first liquid crystal lens 120, and the description is omitted thereto. However, after supplying the voltage to the second driving electrode plates 226, the second liquid crystal molecules 222a can be changed to resemble the optical effect similar to the convex lens. Moreover, the second driving electrode plates 226 can change the refractive index distribution of the second liquid crystal layer 222 by adjusting the supplying voltage, so as to obtain different focal lengths.

It worth noting that, in the present embodiment, the number of the first driving electrode plate 126 and the second driving electrode plate 226 is a pair. However, in other embodiment, the number of the first driving electrode plate 126 and the second driving electrode plate 226 can more than two. The present invention doesn't limit the number of the first driving electrode plate 126 and the second driving electrode plate 226.

In practice, a light reflected by an object S can emit into the optical zoom structure 1. The light emits into the amplifying set 10 firstly. Since the amplifying set 10 resembles the diverging optical effect, the image generated by the light can be magnified. Then, the light emits into the focusing set 20. Since the focusing set 20 resembles the converging optical effect, the image magnified by the amplifying set 10 can be focused by the focusing set 20. The user can see the image after focusing.

Specifically, while the light emits into the amplifying set 10, the light passes through the first fixed focal set 110 firstly. The first fixed focal set 110 is the combination of the convex lens, concave lens, and cemented lens. Thus, the chromatic aberration of the first fixed focal set 110 can be reduced. An image I1 can be generated between the first fixed focal set 110 and the first liquid crystal lens 120. Then, the light emits into the first liquid crystal lens 120. The first driving electrode plates 126 drive the first liquid crystal molecules 122a to resemble the diverging optical effect by changing the applying voltage. Therefore, the image I1 is magnified to generate an image I2 between the first liquid crystal lens 120 and the second fixed focal set 210. In addition, the first driving electrode plates 126 can control the curve ratio of the arranged liquid crystal molecules 122a by adjusting the applying voltage, so as to gain different focal length.

Moreover, the first distance d1 between the first fixed focal set 110 and the first liquid crystal lens 120 is a constant value. The first distance d1 is the sum of the image distance of the first fixed focal set 110 and the object distance of the first liquid crystal lens 120. Since the image distance of the first fixed focal set 110 is a constant value, the object distance of the first liquid crystal lens 120 is also a constant value. While the focal length of the first liquid crystal lens 120 is changed by adjusting the applying voltage of the first driving electrode plates 126, the image distance of the image I2 is changed according to the lens formula.

After passing through the amplifying set 10, the light emits into the focusing set 20. While the light emits into the focusing set 20, the light passes through the second fixed focal set 210 firstly. The second fixed focal set 210 is the combination of the convex lens, concave lens, and cemented lens. Thus, the chromatic aberration of the second fixed focal set 210 can be reduced. An image I3 is generated between the second fixed focal set 210 and the second liquid crystal lens 220. Then, the light emits into the second liquid crystal lens 220. The second driving electrode plates 226 drive the second liquid crystal molecules 222a of the second liquid crystal lens 220 to resemble the converging optical effect by changing the applying voltage. Thus, the image I3 is converged to generate an image I4 between the second liquid crystal lens 220 and the image display region R. In addition, the second driving electrode plates 226 can control the curve ratio of the arranged liquid crystal molecules 222a by adjusting the applying voltage, so as to generate different focal lengths.

Moreover, the distance from the position of the image I2 to the second fixed focal set 210 is the object distance of the second fixed focal set 210. Specifically, the second distance d2 from the first liquid crystal lens 120 to the second fixed focal set 210 is a constant value. The second distance d2 is the sum of the image distance of the first liquid crystal lens 120 and the object distance of the second fixed focal set 210. While the image distance of the first liquid crystal lens 120 is changed, the object distance of the second fixed focal set 210 is changed. Since the focal length of the second fixed focal set 210 is a constant value, the image distance of the second fixed focal set 210 is changed according to the changing of the object distance.

The distance from the position of the image I3 to the second liquid crystal lens 220 is the object distance of the second liquid crystal lens 220. Specifically, the third distance d3 from the second fixed focal set 210 to the second liquid crystal lens 220 is a constant value. The distance d3 is the sum of the image distance of the second fixed focal set 210 and the object distance of the second liquid crystal lens 220. The focal length of the second liquid crystal lens 220 is changed by adjusting the applying voltage of the second driving electrode plates 226. Thus, the image distance of the second liquid crystal lens 220 is changed according to the lens formula. After the light emits to the second liquid crystal lens 220, an image I4 is generated in the image display region R.

In short, the first fixed focal set 110, the first liquid crystal lens 120, the second fixed focal set 210, and the second liquid crystal lens 220 are fixed in the optical zoom structure 1. In other words, the first distance d1, the second distance d2, the third distance d3, and forth distance d4 are constant. Thus, while the user adjusts the applying voltage of the first driving electrode plates 126 and the second driving electrode plates 226 to change the focal length of the first liquid crystal lens 120 and the second liquid crystal lens 220, the object distances and the image distance of the first liquid crystal lens 120, the second fixed focal set 210, and the second liquid crystal lens 220 are changed.

In addition, the magnification of each lens is given by dividing the image distance by the object distance. Hence, while the object distance and the image distance of the first liquid crystal lens 120, the second fixed focal set 210, and the second liquid crystal lens 220 are changed, the magnification of the first liquid crystal lens 120, the second fixed focal set 210, and the second liquid crystal lens 220 are changed. Moreover, the magnification of the optical zoom structure 1 is given by multiplying the magnifications of the first liquid crystal lens 120, the second fixed focal set 210, and the second liquid crystal lens 220. Hence, while the magnification of the first liquid crystal lens 120, the second fixed focal set 210, and the second liquid crystal lens 220 are changed, the optical zoom structure 1 might generate different magnifications.

In the prior art, the magnification of the optical zoom system is changed by changing the distance between the lens. However, in the present invention, the magnification of the optical zoom structure 1 is changed by changing the focal lengths of the first liquid crystal lens 120 and the second liquid crystal lens 220. In other words, in the present invention, the magnification of the optical zoom structure 1 can be changed while the first fixed focal set 110, the first liquid crystal lens 120, the second fixed focal set 210, and the second liquid crystal lens 220 are fixed (which means that the first distance d1, the second distance d2, the third distance d3, and the forth distance d4 are constant). Therefore, compared to the optical zoom system in the prior art, the size of the optical zoom structure 1 in the present invention can be smaller. In the present embodiment, the magnification of the optical zoom structure 1 is in the range of −0.3539 to −0.8342. In addition, the zoom ratio of the optical zoom structure 1 is given by dividing the maximum magnification by the minimum magnification of the optical zoom structure 1. In the present embodiment, the zoom ratio is in the range of 1 to 2.357.

Furthermore, since the magnification of the optical zoom structure 1 is given by multiplying all the magnifications of each lens, the magnification of the optical zoom structure 1 in the present invention can be changed by adjusting the number of the amplifying set and the focusing set. For instance, in another embodiment, the number of the amplifying set can be two or more, and the magnification of the optical zoom structure can be given by the multiplying of two or more magnifications of the amplifying sets and the magnification of the focusing set.

In other words, the present invention doesn't limit the number of the amplifying set and the focusing set. The number of the amplifying set and the focusing set can be changed according to the needed zoom magnification and utilization. The imaging principle of plural amplifying sets and the focusing sets is similar to the previous embodiment, and the description is omitted thereto.

Figure 2:
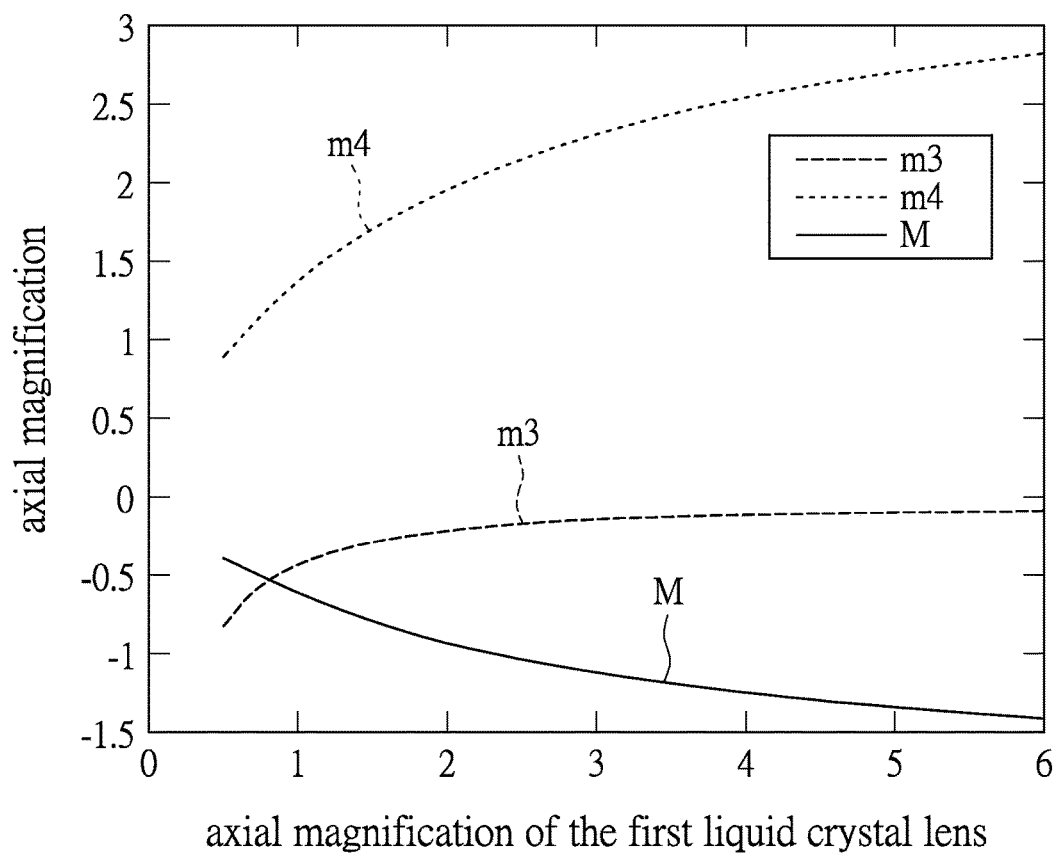
FIG. 2 is the simulating view of the zoom ratio of the optical zoom structure in accordance with a second embodiment of the instant disclosure.

FIG. 2 is the simulating view of the zoom ratio of the optical zoom structure 1 in accordance with a second embodiment of the instant disclosure. In the present embodiment, the first fixed focal set 110 resembles the diverging optical effect and the second fixed focal set 210 resembles the converging optical effect. The focal length of the second fixed focal set 210 is 25 mm. In addition, the first distance d1 is 50 mm, the second distance d2 is 17 mm, the third distance d3 is 18 mm, and the fourth distance d4 is 25 mm. Referring to FIG. 2, in the present embodiment, m3 is the axial magnification of the second fixed focal set 210, m4 is the axial magnification of the second liquid crystal lens 220, and M is the axial magnification of the optical zoom structure 1. As shown in FIG. 2, the axial magnification of the optical zoom structure 1 is in the range of −0.4132 to −0.6815. In addition, the zoom ratio of the optical zoom structure 1 is 1.6493.

Figure 3:
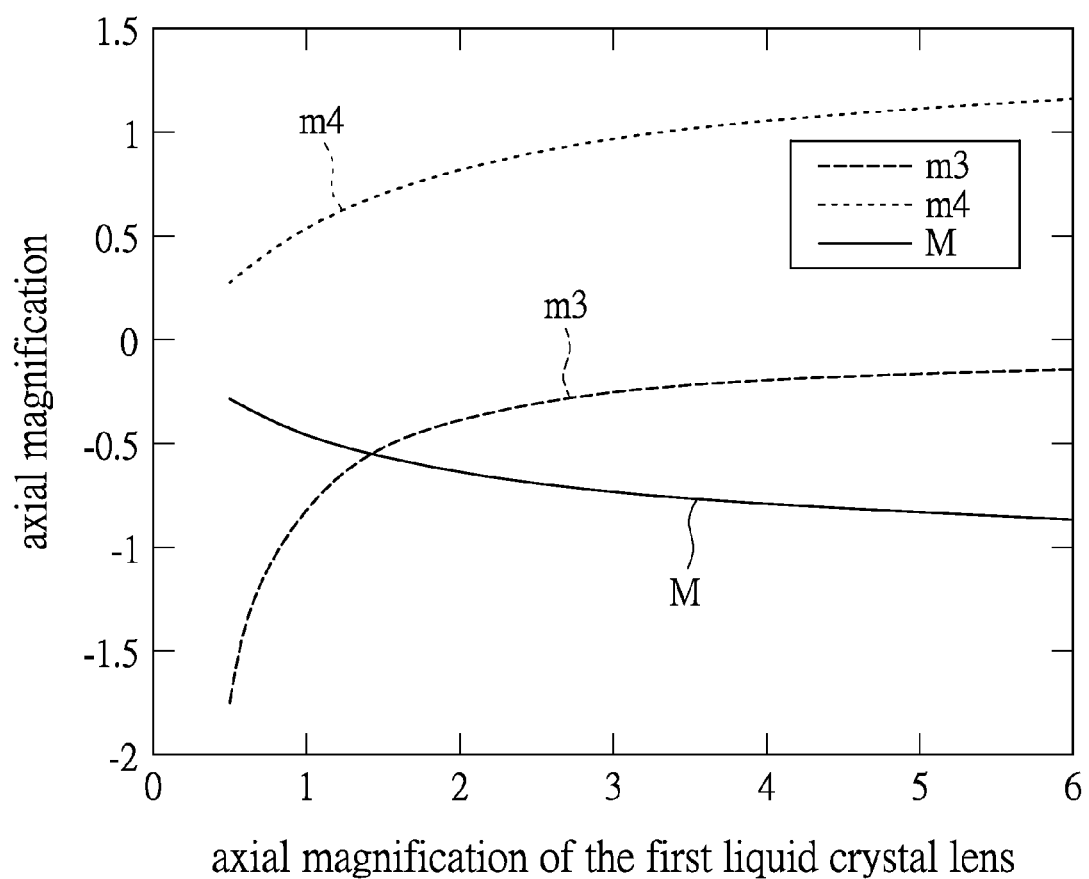
FIG. 3 is the simulating view of the zoom ratio of the optical zoom structure in accordance with a third embodiment of the instant disclosure.

FIG. 3 is the simulating view of the zoom ratio of the optical zoom structure 1 in accordance with a third embodiment of the instant disclosure. In the present embodiment, the first fixed focal set 110 resembles the diverging optical effect and the second fixed focal set 210 resembles the converging optical effect. The focal length of the second fixed focal set 210 is 35 mm. In addition, the first distance d1 is 50 mm, the second distance d2 is 17 mm, the third distance d3 is 18 mm, and the fourth distance d4 is 25 mm. Referring to FIG. 3, m3 is the axial magnification of the second fixed focal set 210, m4 is the magnification is the axial magnification of the second liquid crystal lens 220, and M is the axial magnification of the optical zoom structure 1. As shown in FIG. 3, in the present embodiment, the axial magnification of the optical zoom structure 1 is in the range of −0.4723 to −0.8593. In addition, the zoom ratio of the optical zoom structure 1 is 1.8194.

Figure 4:
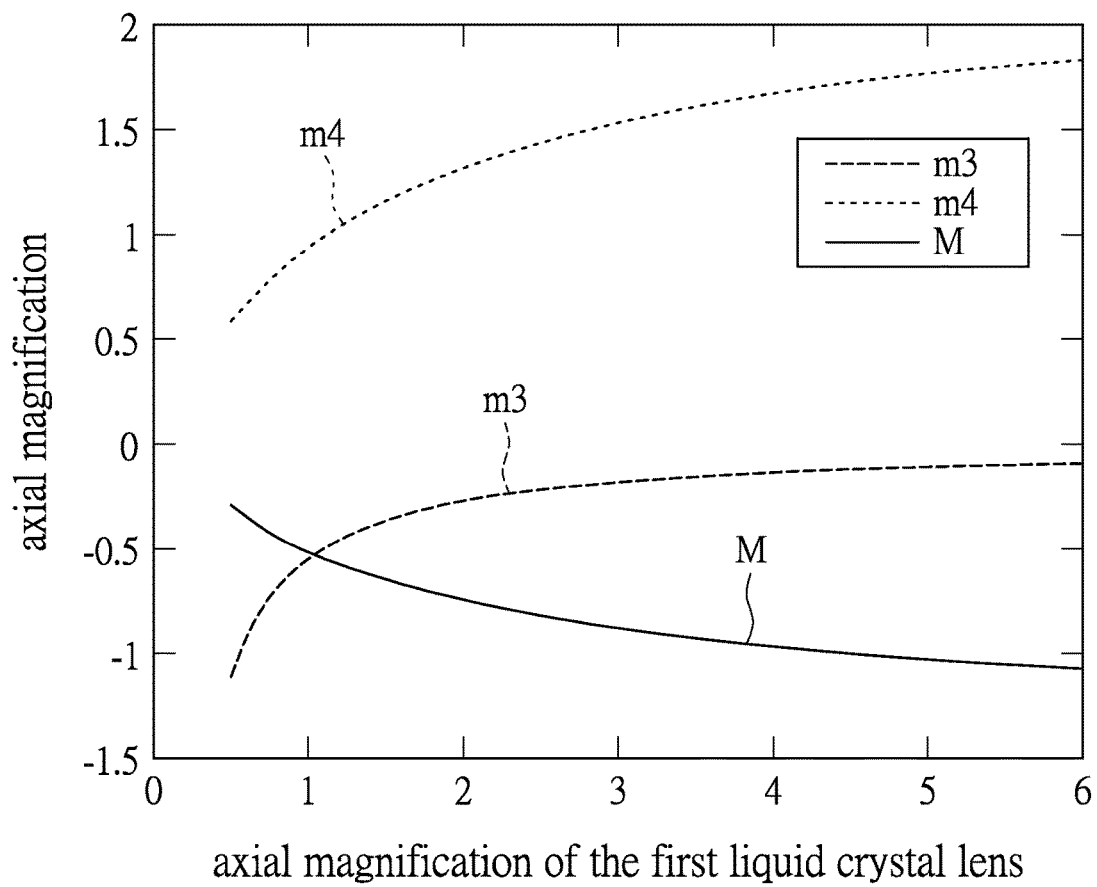
FIG. 4 is the simulating view of the zoom ratio of the optical zoom structure in accordance with a fourth embodiment of the instant disclosure.

FIG. 4 is the simulating view of the zoom ratio of the optical zoom structure 1 in accordance with a fourth embodiment of the instant disclosure. In the present embodiment, the first fixed focal set 110 resembles the diverging optical effect and the second fixed focal set 210 resembles the converging optical effect. The focal length of the second fixed focal set 210 is 29 mm. In addition, the first distance d1 is 50 mm, the second distance d2 is 17 mm, the third distance d3 is 18 mm, and the fourth distance d4 is 25 mm. Referring to FIG. 4, m3 is the axial magnification of the second fixed focal set 210, m4 is the axial magnification of the second liquid crystal lens 220, and M is the axial magnification of the optical zoom structure 1. As shown in FIG. 4, the axial magnification of the optical zoom structure 1 is in the range of −0.3539 to −0.8342, and the zoom ratio of the optical zoom structure 1 is 2.357.

To sum up, the present invention provides an optical zoom structure. The optical zoom structure includes the amplifying set and the focusing set. The amplifying set includes the first fixed focal set and the first liquid crystal lens. The focusing set includes the second fixed focal set and the second liquid crystal lens. The first fixed focal set, the first liquid crystal lens, the second fixed focal set, the second liquid crystal lens are fixed in the optical zoom structure. Thus, the size of the optical zoom structure can be smaller than the prior art. In the present invention, the focal length of the optical zoom structure is changed by adjusting the applying voltage of the first liquid crystal lens and the second liquid crystal lens. Moreover, in the present invention, the number of the amplifying set and the focusing set can be changed so as to gain different magnifications.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. An optical zoom structure, comprising:
   at least an amplifying set, comprising:
      a first fixed focal set comprising a plurality of first optical lenses;
      a first liquid crystal lens,
      wherein the amplifying set resembles a diverging optical effect;
   at least a focusing set, comprising:
      a second fixed focal set comprising a plurality of second optical lenses;
      a second liquid crystal lens,
      wherein the focusing set resembles a converging optical effect; and
   an image display region,
      wherein the focusing set is disposed between the amplifying set and the image display region, the first liquid crystal lens and the second fixed focal set are disposed between the first fixed focal set and the second liquid crystal lens,
      wherein a first distance is the distance between the first fixed focal set and the first liquid crystal lens, a second distance is the distance between the first liquid crystal lens and the second fixed focal set, a third distance is the distance between the second fixed focal set and the second liquid crystal lens, and a fourth distance is the distance between the second liquid crystal lens and the image display region,
      wherein the first distance, the second distance, the third distance, and the forth distance are constant value,
      wherein a focal length of the first liquid crystal lens is changed by adjusting an applying voltage of the first liquid crystal lens, and a focal length of the second liquid crystal lens is changed by adjusting an applying voltage of the second liquid crystal lens.

2. The optical zoom structure as recited in claim 1, wherein the first optical lenses comprising a convex lens, a concave lens, and a cemented lens.

3. The optical zoom structure as recited in claim 2, wherein the arrangement of the first optical lenses is the convex lens, the concave lens, and the cemented lens in sequence, and the first optical lenses resembles the diverging optical effect.

4. The optical zoom structure as recited in claim 1, wherein the second optical lenses comprising a convex lens, a concave lens, and a cemented lens.

5. The optical zoom structure as recited in claim 4, wherein the arrangement of second optical lenses is the concave lens, the convex lens, and the cemented lens in sequence, and the second optical lenses resembles the converging optical effect.

6. The optical zoom structure as recited in claim 1, wherein the first liquid crystal lens comprises:
   at least a first liquid crystal layer comprising a plurality of first liquid crystal molecules; and
   at least a pair of first driving electrode plates,
   wherein the first liquid crystal layer is disposed between the first driving electrode plates, and the first driving electrode plates drives the first liquid crystal molecules to resemble the diverging optical effect.

7. The optical zoom structure as recited in claim 1, wherein the second liquid crystal lens including:
   at least a second liquid crystal layer comprising a plurality of second liquid crystal molecules; and
   at least a pair of second driving electrode plates,
   wherein the second liquid crystal layer is disposed between the second driving electrode plates, and the second driving electrode plates drives the second liquid crystal molecules to resemble the converging optical effect.

8. The optical zoom structure as recited in claim 1, wherein the number of the amplifying set is greater than or equal to 2.

* * * * *